Oct. 5, 1965    E. RASTÁK ET AL    3,210,085
DEVICE FOR SPREADING OF ARTIFICIAL FERTILIZERS
Filed Jan. 2, 1964

INVENTORS
Emil Rašťák, Stanislav Machálka
BY
Richard [signature]
Ag't

United States Patent Office 3,210,085
Patented Oct. 5, 1965

1

3,210,085
DEVICE FOR SPREADING OF ARTIFICIAL
FERTILIZERS
Emil Rašťák, Gottwaldov, and Stanislav Machálka, Ostrokovice, Czechoslovakia, assignors to Vyzkumny a Zkusební Letecký ustav, Letnany u Prahy, Czechoslovakia
Filed Jan. 2, 1964, Ser. No. 335,227
Claims priority, application Czechoslovakia, Jan. 25, 1963, 434/63
6 Claims. (Cl. 275—15)

This invention relates to a rotary device for spreading fertilizer and similar particulate material from airplanes and helicopters.

Known devices for spreading fertilizer from airplanes use a Venturi-tube arranged on the fuselage. The fertilizer is dropped from a hopper through a closure into the tube, where it is entrained and dissipated by the passing air stream.

The individual particles attain only low transverse velocity in the air stream so that the strip of land treated in one passage is relatively narrow (at the most about 10 m.) and the distribution of the fertilizer is not uniform. After closing of the hopper, additional fertilizer that adhered to the walls of the tube is released so that the fertilizer falls upon parts of the ground that were not intended to be treated.

Known ground-based systems for spreading fertilizer are large and heavy so that they are not suitable for spreading from airplanes.

It is an object of this invention to provide a device for spreading particulate fertilizer from airplanes, which avoids the drawbacks of the known airborne devices. The apparatus of the invention includes a distributing disk, known per se in ground based spreading devices. Important features of the device according to this invention are an adjustable outlet on the bottom orifice of the hopper and a ribbed metering disk in the outlet. This metering disk is coaxially linked by gearing with the spreading disk in such a manner that the two disks may be rotated at different speeds by a common drive shaft.

The most important advantages of the invention over Venturi type devices are the substantially greater width of the treated strip (about 40 to 50 m.), the exact metering of the spread material, the instantaneous starting and stopping of the spreading action, and the adjustability of the width of the treated strip which may even be unsymmetrical with respect to the path of the airplane.

Figure 1:
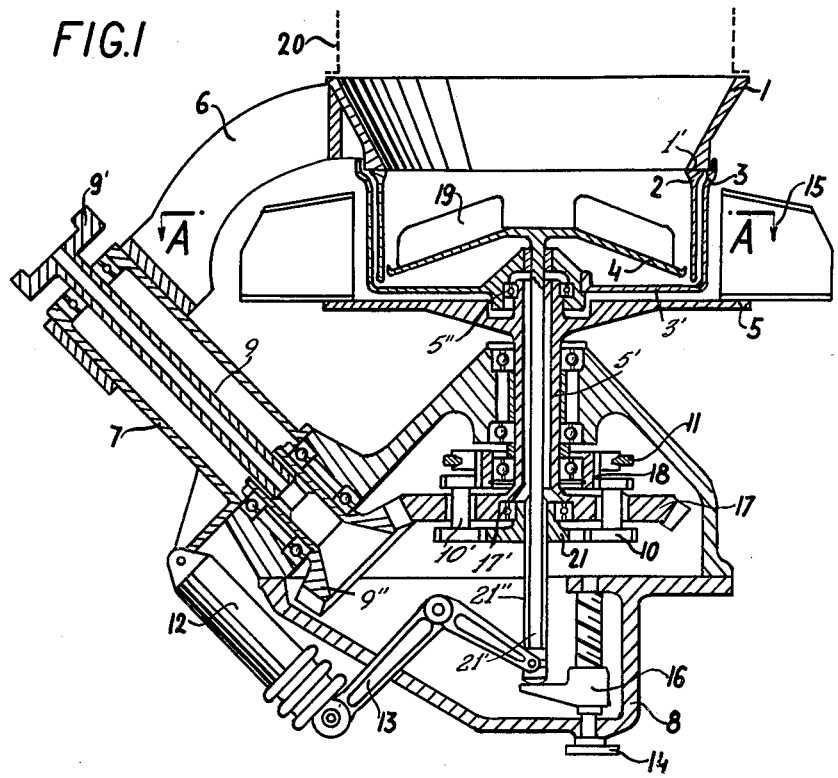
Figure 2:
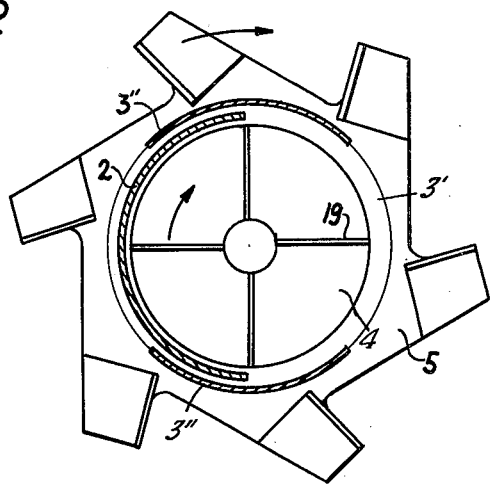

An illustrative embodiment of this invention is shown in the accompanying drawing in which FIG. 1 is a longitudinal sectional view of the device and FIG. 2 is a cross section taken on the line A—A.

The device comprises a funnel shaped hopper 1 which is fixedly attached to a storage container 20 not shown in detail, and being part of the fixed structure of an airplane, not otherwise shown. The bottom of the hopper 1 is provided with an adjustable outlet which consists of a stationary wall member 2 and a rotatable outlet member 3. The fixed wall member 2 is a 180° segment of a cylinder coaxially attached to the bottom of the hopper 1 and of slightly larger diameter than the lower hopper orifice 1'.

The movable outlet member has a generally flat bottom portion 3' and two diametrically opposite axially extending portions 3" which are segments of a cylinder slightly larger in diameter than the cylindrical wall member 2. The cylindrically arcuate portions 3" of the outlet member 3 thus define two gaps therebetween. In the angular position of the outlet member 3 shown in FIG. 2, one of the gaps is blocked by the wall member 2 whereas the other gap is fully open. Frictional engagement with the hopper 20 normally holds the outlet member 3 in its angular position.

2

A bracket 6 fixedly attached to the hopper 1 carries one end of a short tube 7 the other end of which supports a gear casing 8. A shaft 9 coaxially journaled in the tube 7 has a drive pinion 9' attached to one end thereof which projects outward from the tube 7, and carries a bevel gear 9" on its other end in the casing 8.

A tubular upright shaft 5' journaled in the wall of the casing 8 fixedly connects a bevel gear 17 on the lower end of the shaft within the casing 8 with a distributing or spreading disk 5 on the upper end of the shaft 5'. The gear 17 meshes with the bevel gear 9". The upper end of the shaft 5' supports the aforementioned outlet member 3 by means of an antifriction bearing 5" which permits free rotation of the outlet member about the common vertical axis of the shaft 5' and the hopper 1.

Planet pins 10' eccentrically passing through the bevel gear 17 and freely rotatable therein fixedly connect planet gears 10 of two sets of such gears on opposite radial faces of the gear 17. One set of planet gears 10 meshes with a gear 18 coaxially rotatable on the shaft 5' and equipped with a drum brake 11.

The other set of planet gears 10 meshes with a gear 21 which is axially slidable on a shaft 21', but is secured to the shaft for joint rotation about the axis of the shaft 5' by splines 21" on the shaft 21'. The gear 21 rotates in a bearing 17' in the bevel gear 17. The gears 17, 10, 18, and 21 thus constitute differential gearing in which the bevel gear 17 is the input member and the gears 18 and 21 are the output members which rotate at speeds the difference of which is determined by the resistance to their rotation offered by respective applied loads, such as the brake 11.

The upper end of the shaft 21' passes movably through the center of the bottom portion 3' of the outlet member 3 and fixedly carries a metering disk 4 within the cylindrical outlet chamber defined between the bottom of the hopper 1 and the bottom portion 3' of the outlet member 3 by the wall member 2 and the axially extending portions 3" of the outlet member 3. The disk 4 is of frustoconical shape about the axis of the shaft 4 and carries radial ribs 19 on its upper face. Six spouts 15 circumferentially spaced on the distributing disk 5 are approximately radially aligned in the operative position of the device shown in FIG. 1 with the metering disk 4 and the openings in the wall of the outlet chamber between the portions 3".

The lower end of the shaft 21' abuts against a stop 16 threadedly mounted on an adjusting screw 14 which is rotatably arranged on the casing 8. Upward axial movement of the shaft 21' from the illustrated position may be actuated by a pressure-fluid actuated control cylinder 12 whose piston is linked to the shaft 21' by a bell crank lever 13 pivoted on the casing 8.

The afore-described apparatus is operated as follows:

In the inoperative position of the spreading device, pressure fluid in the control cylinder 12 holds the shaft 21' in a position upwardly spaced from the operative position illustrated in FIG. 1 in which the outer rim of the metering disk 4 sealingly engages the orifice 1' of the hopper 20. The brake 11 is fully released. The shaft 9 is connected to a prime mover in a conventional manner, not requiring illustration, and rotates the spreading disk 5. Because the metering disk is stopped by its engagement with the hopper orifice, the gear 18 spins idly on the shaft 5'.

When spreading is to be started, the metering disk 4 is lowered by means of the control cylinder 12 to the illustrated position, and the brake 11 is applied to the gear 18, thereby slowing or arresting the gear 18, and causing rotation of the metering disk 4 at a corresponding rate.

The rate of fertilizer discharge is determined by the rotary speed of the disk 4, and by the distance between the metering disk 4 and the lower orifice of the hopper 1. The lowermost position of the disk 4 is determined by the stop 16 and is controlled by the screw 16.

The adjustable outlet constituted by the members 2, 3 permits the fertilizer to be spread predominantly to one or to the other side or symmetrically to both sides of the flight path.

The width of the treated strip of ground is determined by the height of the airplane above the ground, by the rotary speed of the spreading disk 5, and by the position of the outlet member 3.

We claim:

1. A device for spreading a particulate material from an aircraft comprising, in combination:
    (a) a hopper having a downwardly open orifice;
    (b) outlet means defining an outlet chamber under said orifice, said chamber having an axis and being formed with a plurality of openings therein, said openings being angularly spaced about said axis for radially outward passage of particulate material from said chamber;
    (c) closing means for selectively closing said openings;
    (d) a metering disk mounted in said chamber for rotation about said axis and for axial movement toward and away from a position of sealing engagement with said orifice;
    (e) spreading means including a plurality of spout means arranged for rotary movement about said axis in a path adjacent said opening and outside said chamber;
    (f) differential drive means operatively connected to said metering disk and to said spreading means for simultaneously rotating the same about said axis at different speeds; and
    (g) actuating means for actuating axial movement of said metering disk toward and away from said position thereof.

2. A device as set forth in claim 1, wherein said drive means include differential gearing operatively connected to said metering disk and to said spreading means, said gearing including an input member and two output members, and a drive shaft connected to said input member, said metering disk being connected to one of the output members, and said spreading means being connected to one member of the pair constituted by said input member and the other output member.

3. A device as set forth in claim 2, wherein said spreading means are connected to said input member.

4. A device as set forth in claim 3, further comprising brake means engageable with the other output member of said gearing.

5. A device as set forth in claim 1, wherein said outlet means include a plurality of wall members angularly movable relative to each other, one of said wall members constituting said closing means.

6. A device as set forth in claim 1, said spreading means including a disk member arranged for rotation about said axis and carrying said spout means.

References Cited by the Examiner

UNITED STATES PATENTS

| 396,251 | 1/89 | Adamson | 275—15 X |
| 2,898,008 | 8/59 | Hillwick et al. | 275—8 X |
| 2,945,698 | 7/60 | Kaller | 275—8 X |
| 2,954,982 | 10/60 | Saiberlich | 275—15 X |
| 3,038,729 | 6/62 | Stokland | 275—5 |

ABRAHAM G. STONE, *Primary Examiner.*

WILLIAM A. SMITH, III, *Examiner.*